United States Patent
Akundi et al.

(10) Patent No.: US 7,496,955 B2
(45) Date of Patent: Feb. 24, 2009

(54) DUAL MODE FIREWALL

(75) Inventors: Kamesh Akundi, Karnataka (IN);
Thomas Guerrette, Milpitas, CA (US);
John Gawf, Boulder, CO (US); Rajan Goyal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 745 days.

(21) Appl. No.: 10/721,571

(22) Filed: Nov. 24, 2003

(65) Prior Publication Data
US 2005/0114648 A1    May 26, 2005

(51) Int. Cl.
*G06F 9/00* (2006.01)

(52) U.S. Cl. .................... 726/11; 370/392; 370/428; 370/401; 711/216

(58) Field of Classification Search ............. 726/11–14; 713/153; 709/240–241, 227, 224; 370/392, 370/428, 401; 711/216
See application file for complete search history.

(56) References Cited

U.S. PATENT DOCUMENTS

| | | | |
|---|---|---|---|
| 6,240,533 B1 * | 5/2001 | Slemmer ................... | 714/48 |
| 6,505,254 B1 | 1/2003 | Johnson et al. ............ | 709/239 |
| 6,854,063 B1 | 2/2005 | Qu et al. .................... | 713/201 |
| 7,093,283 B1 * | 8/2006 | Chen et al. ................. | 726/6 |
| 7,143,188 B2 * | 11/2006 | Maufer et al. .............. | 709/245 |
| 2003/0149766 A1 * | 8/2003 | Syvanne et al. ............ | 709/224 |

OTHER PUBLICATIONS

Examiner's Communication pursuant to Article 96(2) EPC Sep. 18, 2006, from corresponding European Patent Application No. 04 811 173.6, Dual Mode Firewall, 9 pp.
Bart de Schuymer, Nick Fedchik, *Ebtables/Iptables Interaction On A Linux-Based Bridge*, Nov. 9, 2003, http://ebtables.sourceforge.net/br_fw_ia/br_fw_ia.pdf, printed Mar. 31, 2005, 11 pages.
Cedric Blancher, *Layer 2 Filtering and Transparent Firewalling*, Libre Software Meeing, Jul. 9, 2003, http://sid.rstack.org/pres/0307_lsm03_12_filter.pdf, printed Mar. 30, 2005, pp. 12-25.
Ralf Spenneberg, *Bridgewalling—Using Netfilter in Bridge Mode*, LINUX-KONGRESS, Sep. 4, 2002, Cologne, Germany, http://www.spenneberg.com/talks/linux-kongress2002/ralf-spenneberg.bridgewall.pdf, printed Mar. 30, 2005, 6 pages.

(Continued)

*Primary Examiner*—Thanhnga B Truong
(74) *Attorney, Agent, or Firm*—Weaver Austin Villeneuve & Sampson LLP

(57) ABSTRACT

Methods and devices are provided for implementing a dual mode firewall. Some implementions provide a firewall in a network device that acts as bridge for layer 2 traffic and acts as a router for layer 3 traffic. In some implementions, a determination of whether to act as a bridge or a router for a packet is based on the configuration of the interface handling the packet. In some implementations, the network device inspects a destination of each packet to determine whether to act as a bridge or a router for that packet. The firewall screens both the layer 2 and the layer 3 traffic according to policies implement in the firewall.

20 Claims, 5 Drawing Sheets

OTHER PUBLICATIONS

Netgear, *MR814 4-PORT Wireless Router with 10/100 Mbps Switch*, Netgear Product Specification, Nov. 13, 2003, http://www.netgear.com/pdf_docs/MR814v2_13Nov2003.pdf, printed Mar. 31, 2005, 1 page.

Brian Hill, *Cisco: The Complete Reference—Chapter 20, Layer 3 Switching*, *McGrawhill*, Feb. 2002, http://web10.eppg.com/betabooks/nov01/hill/ch20.html, printed Mar. 31, 2005, 20 pages.

Rolf McClellan, *Cisco Catalyst 6500 with Multilayer Switching Feature Card (MSFC)*, McClellan Consulting, Aug. 1999, http://www.mcclellanconsulting.com/whitepapers/6500performance.pdf, printed Mar. 30, 2005, 7 pages.

*Database WPI*, Section EI, Week 200372 Derwent Publications Ltd., London, GB, AN 2003-757724 & CN 1437114 (Lenovo Beijing Co Ltd), Aug. 20, 2003, Abstract, 1 page.

Office Action in Corresponding EP Application No. 04-811 173. 6—2413, Dated May 11, 2007, 4 pages.

International Search Report mailed Apr. 20, 2005 from International Application No. PCT/US2004/038357, including Notification of Transmittal, and Written Opinion of the International Searching Authority dated Apr. 20, 2005 from International Application No. PCT/US2004/038357, 14 pages. (CISCP353.WO).

* cited by examiner

DUAL MODE FIREWALL

BACKGROUND OF THE INVENTION

1. Field of the Invention

The present invention relates to network technology. More particularly, the present invention relates to firewalls.

2. Description of the Related Art

Firewalls are important tools for protecting networks or portions of networks. Typically, a firewall is used to filter traffic between portions of networks (e.g., between subnets), between a private network and other networks (e.g., the Internet), etc. Firewalls inspect packets routed from, e.g., one subnet to another based on policies configured in the firewall. The term "packet" will be used broadly herein to include frames, true packets and similar data units.

If a firewall is disposed between a private network and the Internet, the Internet is "outside" the firewall and the private network is "inside" the firewall. For example, the firewall may be configured to permit nodes inside the firewall to have unrestricted access to the Internet while inspecting packets from outside the firewall to filter out "spam," viruses, etc.

Current firewalls typically operate at layer 3 (L3), though some operate at layer 2 (L2). Therefore, the deployment of a firewall typically implies that there are layer 3 (subnet) separations between the inside and outside segments. This is acceptable if the firewall is running on a network device functioning, e.g., as a router with a pre-existing subnet separation. However, complications arise when the firewall is to be placed within an existing network. In such situations, the network has to be re-subnetted to build it around the firewall, a task that is tedious and resource-intensive.

It would be desirable to implement improved methods and devices for implementing firewalls.

SUMMARY OF THE INVENTION

Methods and devices are provided for implementing a dual mode firewall. Some implementations provide a firewall in a network device that acts as a bridge for layer 2 traffic and acts as a router for layer 3 traffic. In some implementations, a determination of whether to act as a bridge or a router for a packet is based on the configuration of the interface handling the packet. In some implementations, the network device inspects a destination of each packet to determine whether to act as a bridge or a router for that packet. The firewall screens both the layer 2 and the layer 3 traffic according to policies implemented in the firewall.

Some embodiments of the invention provide a firewall. The firewall includes: a first port configured for communication with a first device within a first network; a second port configured for communication with a second device within the first network; a third port configured for communication between the first network and a second network; and at least one processor.

The processor or processors are configured to do the following: determine that a first portion of the incoming packets should be bridged, the first portion having a first source address and a first destination address within the first network; apply a first screening process to the first portion; determine that a second portion of the incoming packets should be routed; and apply a second screening process to the second portion.

The processor or processors may be configured to control traffic within the first network (e.g., between the first device and the second device) according to a spanning tree protocol and may be configured to control traffic between the first device and the second device according to one or more fields in a layer 2 header of a packet.

The processor or processors may be configured to perform an initial check on a packet, such as checking whether the packet should be broadcast or multicast, or checking for Internet protocol fragments. The screening processes may be implemented based upon inspection of one or more of layers 2 through 7. The processor or processors may be configured to allow dynamic host configuration protocol ("DHCP") packets to pass with or without inspection.

The processor or processors may be configured to control traffic between the first device and the second device according to layer 2 access lists applied to one or more fields in the layer 2 header of the packet. The fields may be, for example, a source media access control address field, a destination media access control address field or a protocol field.

Some implementations of the invention provide a method of implementing a firewall. The method includes the following steps: receiving first packets and second packets; determining that the first packets should be bridged, the first packets having a first source address and a first destination address within the first network; applying a first screening process to the first packets; determining that the second packets should be routed; and applying a second screening process to the second packets.

The bridging step may include performing a bridge lookup based upon media access control address information of the first packets. The screening processes may be implemented based upon inspection of one or more of layers 2 through 7. The screening processes may involve performing an access list check.

Alternative embodiments of the invention provide a computer program embodied in a machine-readable medium. The computer program includes instructions for controlling a firewall to perform the following steps: receive first packets and second packets; determine that the first packets should be bridged, the first packets having a first source address and a first destination address within the first network; apply a first screening process to the first packets; determine that the second packets should be routed; and apply a second screening process to the second packets.

The computer program may also include instructions for causing the firewall to perform a bridge lookup based upon media access control address information of the first packets. The computer program can include instructions for causing the firewall to perform an access list check. The screening processes may be implemented based upon inspection of one or more of layers 2 through 7.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Figure 1:
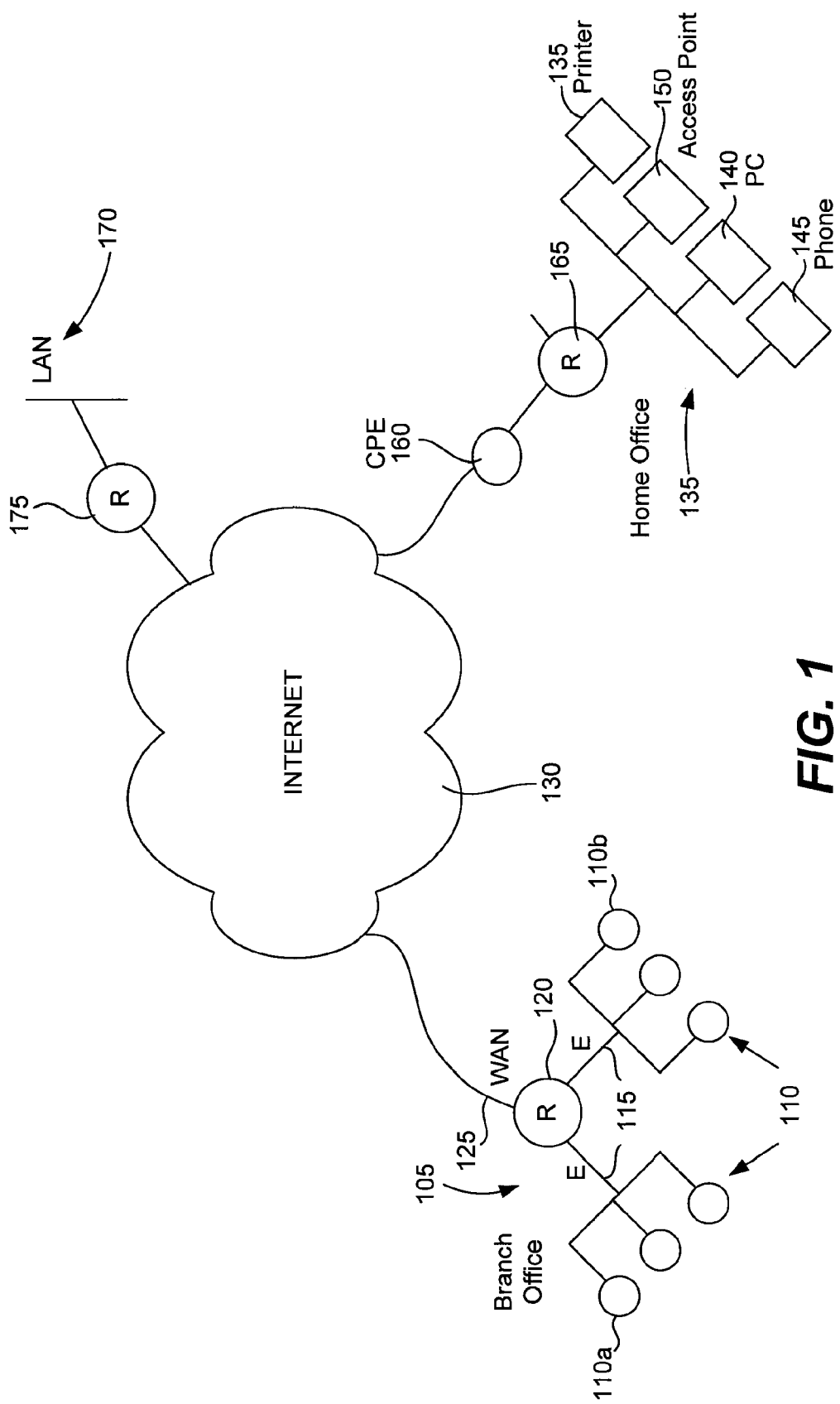
FIG. 1 is a network diagram that illustrates some uses of firewalls.

FIG. 1 illustrates some uses of firewalls in various types of networks. Home office 135 includes personal computer 140, telephone 145, wireless access point 150 and printer 155. A service provider has installed customer premise equipment ("CPE") 160 to provide Internet access to home office 135. CPE 160 may provide, for example, DCHP addresses to the elements of home office 135.

Installing L3 firewall 165 can cause complications unless the firewall is configured according to the present invention. For example, a prior art L3 firewall would not necessarily pass through Dynamic Host Configuration Protocol ("DHCP") addresses. (As known by those of skill in the art, DHCP provides a mechanism for allocating IP addresses dynamically so that the addresses can be reused when hosts no longer need them.) If DHCP addresses are not passed through, the devices in home office 135 would need to be re-numbered. The firewall would require a network address translation ("NAT"). However, some firewalls (particularly the less expensive firewalls marketed for home use) may not allow applications to run with NAT. Network devices according to the present invention can provide both the transparent forwarding of layer 2 ("L2") traffic and L3 routing capabilities, as well as the implementation of security policies at L2 and L3. For example, home office 135 may implement L2 screening between wireless access point 150 and other elements of home office 135, in addition to filtering spam from Internet 130.

Branch office network 105 includes hosts 110 connected via Ethernet to network device 120, which includes a firewall. Network device 120 is connected via wide area network ("WAN") 125 to Internet 130. If network device 120 is configured according to the present invention, network device 120 can provide both the transparent forwarding of L2 traffic between nodes 110, L3 routing capabilities on WAN 125 and the implementation of security policies at L2 and L3. For example, network device 120 may implement L2 security policies that permit node 110a to send packets to node 110b, but not vice versa. Network device 120 may also implement L3 security policies that restrict traffic between Internet 130 and branch office 105. Similar functionality may be provided to local area network 170 by network device 175.

A network device configured according to the present invention can act as a router and also as a bridge (e.g., an IEEE 802.1d bridge). Preferred embodiments perform the basic bridging operation of learning media access control ("MAC") addresses on ports to restrict a collision domain. Preferred embodiments also run the Spanning Tree Protocol ("STP") to guard against loops in network topology. STP is described, for example, in U.S. Pat. No. 6,535,491, which is hereby incorporated by reference in its entirety. Some such embodiments of the network device maintain a bridging table that maps MAC addresses to destination ports.

The network device can function as a transparent bridge between a variety of media, such as Ethernet, token ring and FDDI. Additionally, it can operate as a transit bridge with LAN media on one side and ATM, Frame Relay, PPP, etc., on the other side. Preferred embodiments use the concept of a "bridge group" to identify interfaces to be bridged. According to some embodiments, a transparent bridging module is invoked from a device driver of the network device and executes in the interrupt context. Preferably, there is also a process path for bridging certain packets that cannot be bridged in the interrupt path. Some of the L3 features might not be invoked by the bridging code of the bridging module.

The network device preferably implements security policies at L2 and L3. For example, some embodiments support MAC (L2) access lists on interfaces configured for bridging. Some such network devices determine whether a packet is to be bridged or routed depending on the destination L2 and/or L3 addresses in the packet.

Some network devices according to the present invention can bridge on some interfaces and present an L3 Bridge-Group Virtual Interface ("BVI") to the routing code for routing. A BVI is the interface for the Integrated Routing and Bridging (IRB) features. Using IRB, one can route a given protocol between routed interfaces and bridge groups within a single switch router. Specifically, local or unroutable traffic will be bridged among the bridged interfaces in the same bridge group, while routable traffic will be routed to other routed interfaces or bridge groups.

Because bridging is in the data-link layer (Layer 2) and routing is in the network layer (Layer 3), they have different protocol configuration models. With IP, for example, bridge group interfaces belong to the same network and have a collective IP network address. In contrast, each routed interface represents a distinct network and has its own IP network address. IRB uses the concept of a BVI to enable these interfaces to exchange packets for a given protocol.

A BVI is a virtual interface within the network device that acts like a normal routed interface. A BVI does not support bridging, but it actually represents the corresponding bridge group to routed interfaces within the switch router. The interface number is the link between the BVI and the bridge group.

Figure 2:
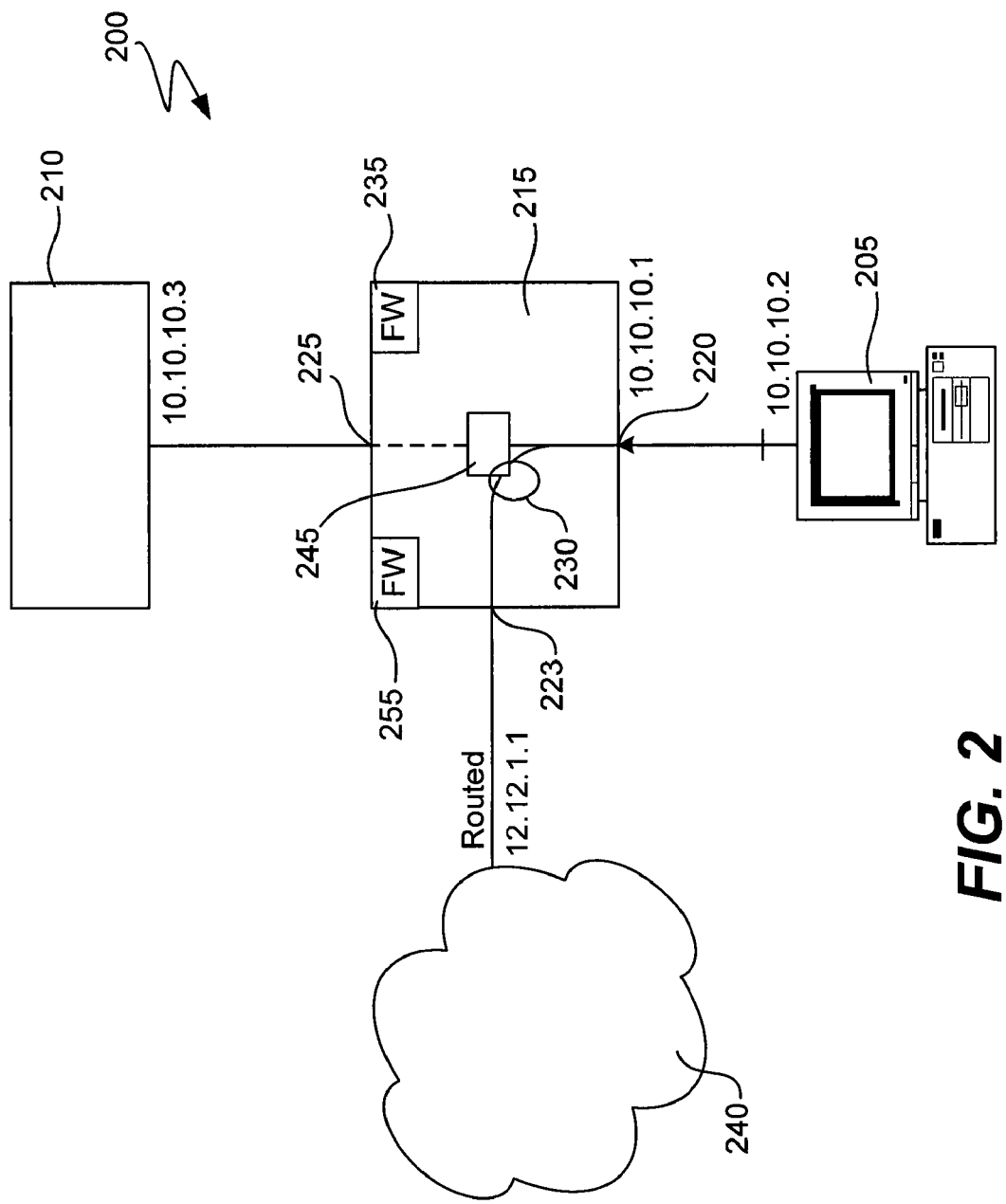
FIG. 2 is a network diagram that illustrates a dual mode firewall according to some aspects of the invention.

A high-level description of a dual mode firewall will now be described with reference to FIG. 2. In this example, when host 205 sends a packet to host 210, network device 215 bridges the packet according to an L2 address, which is a MAC address in this instance. Here, interfaces 220 and 225 are configured for bridging. Network device receives the packet, determines that hosts 205 and 210 are in the same bridge group, determines that host 205 is permitted to send packets to host 210, then bridges the packet to host 210. Here, hosts 205 and 210 are in the same subnet (10.10.10): there is no need to create additional subnets in network 200 in order to install network device 215.

Interface 223 is connected to BVI 230, which is the default gateway for all hosts in network 200. In this example, if any of the hosts in network 200 need to send a packet to Internet 240 (or to any network outside of network 200), the host will address the packet to the MAC address of the BVI. Preferably, the BVI will route the packet (or not) according to security policies implemented at L3. Similarly, network device 215 will preferably make screening and forwarding decisions regarding packets received by the BVI from outside of network 200 (e.g., from Internet 240) according to security policies implemented at L3. However, the security policies may be implemented based upon inspection of one or more of layers 2 through 7. Preferably, new features implemented on the L3 firewall 255 automatically work for L2 firewall 235.

According to preferred implementations of the invention, configuring the L2 firewall involves configuring a bridge group, as described above, and putting interfaces in the bridge group. The bridge group will indicate which interfaces can receive packets from one another. Configuring the L2 firewall also involves implementing a security policy, functionality for inspection/auditing of packets, etc., according to methods known by those of skill in the art. For example, Access Control Lists ("ACLs") may be implemented on any of the interfaces in the bridge in line with the security policy. Although the security policy may be based only upon inspection at L2, the security policy may alternatively be based upon inspection of one or more of layers L2 through L7. The concept of an "inside" or an "outside" interface will be implied by the configuration, as is the case with an L3 firewall as described above.

Figure 3:
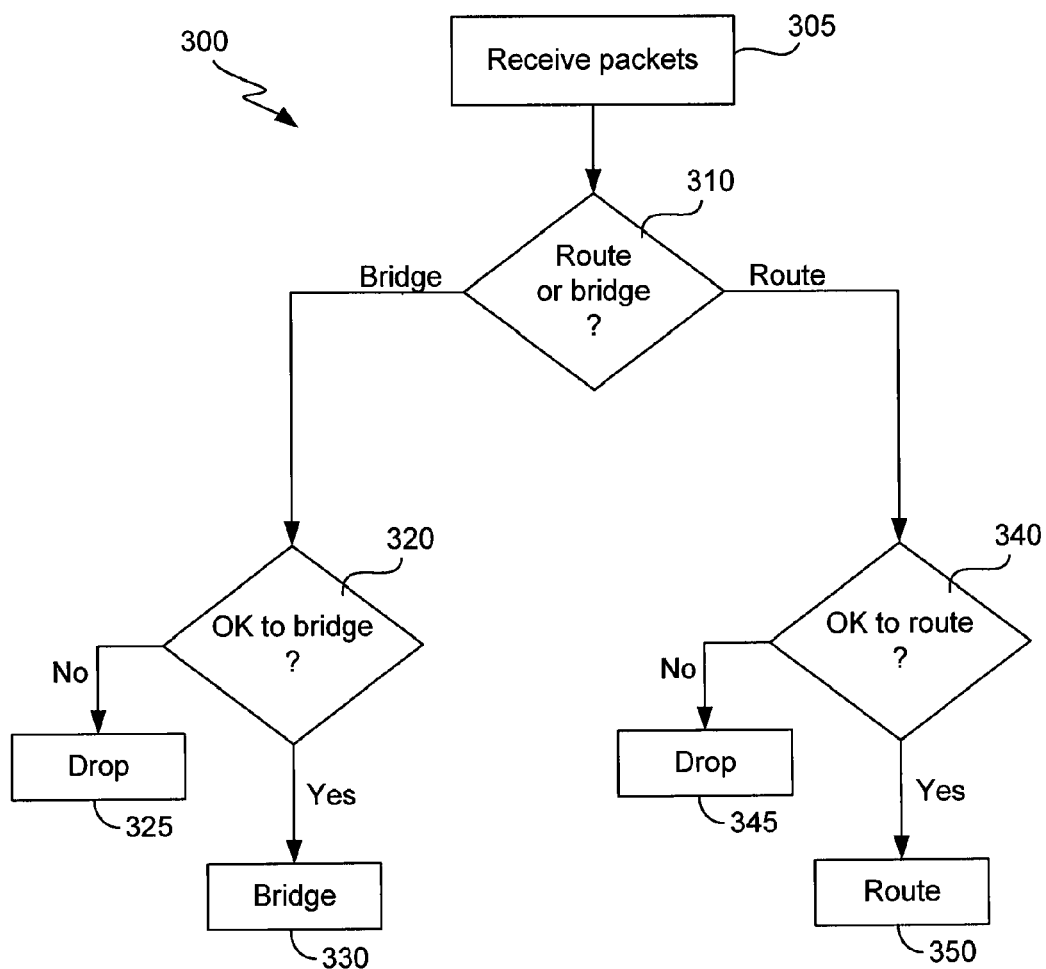
FIG. 3 is a flow chart that outlines some general concepts of a method according to the present invention.

The operation of a network device configured as a dual mode firewall will now be explained with reference to FIGS. 3 and 4. FIG. 3 provides a very broad overview of this operation and FIG. 4 outlines the operation of certain implementations in more detail.

Method 300 of FIG. 3 begins with step 305, wherein an interface of the network device receives a packet. In step 310, it is determined whether the packet needs to be routed or bridged. If the packet should be bridged, the packet is screened in step 320, e.g., according to an L2 ACL. In step 320, a determination may be made of whether to bridge the packet according to an inspection at any predetermined layer or layers from L2 to L7. 235. The packet is either dropped (step 325) or bridged (step 330) according to the determination of step 320.

If the packet should be routed, the process continues from step 310 to step 340. In step 340, a determination is made of whether to route the packet according to an inspection at any predetermined layer or layers from L2 to L7. The packet is either dropped (step 345) or routed (step 350) according to the determination of step 340.

Figure 4:
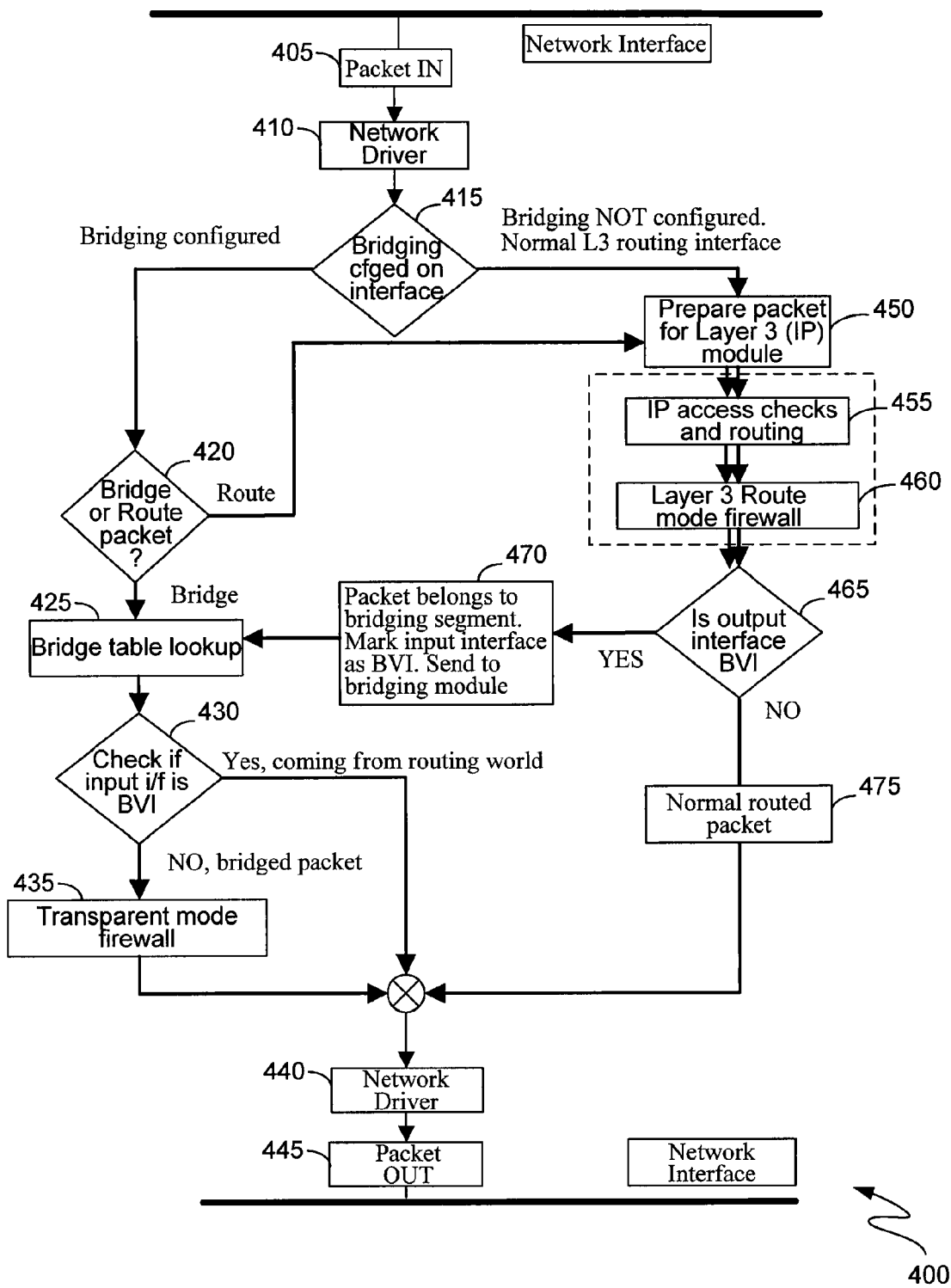
FIG. 4 is a flow chart that indicates more details of a method according to the present invention.

Referring now to FIG. 4, further details of some implementations will now be explained. In step 405, a packet arrives from an interface of a network device and is obtained by a network driver operating at layer 1. The network driver forwards the packet to a module (e.g., bridging module 245) for a determination as to whether bridging is configured on the interface on which the packet arrived (step 415).

If bridging is configured on the interface, a decision is made in step 420 as to whether the packet should be bridged or routed. According to some implementations, the decision in step 420 is made according to whether the packet's MAC address is in a bridging table. As known to those of skill in the art, a bridging table is normally populated by "listening" to the network and storing MAC addresses. If the packet's MAC address is in the bridging table, the packet will be bridged. If the packet's MAC address is not in the bridging table, the packet will be sent to the router side for further processing.

For packets having a MAC address in the bridging table, the process continues to step 425 wherein a bridging table lookup is performed to determine the output interface(s) for the packet. Then, in step 430, the input interface is examined to determine whether the input interface was a BVI. If so, according to preferred embodiments the assumption will be made that the packet has already passed through an L3 firewall. If not, the packet is evaluated according to security policies applied at any of layers L2 through L7. (step 435). Then, the packet is sent to a network driver (step 440) and sent out an egress port (step 445).

If bridging is not configured on the ingress interface, step 415 is followed by step 450, wherein the packet is prepared for an L3 module. For example, in step 450 data may be cached into data structures that will be used later in the L3 processing. In step 455, IP access checks and IP routing decisions are made. In step 460, the packet is evaluated according to the security policies of an L3 firewall.

In step 465, the output interface is evaluated to determine whether it is a BVI. If the output interface is a BVI, in step 470 the input interface is marked as a BVI and the packet is sent to a bridging module (e.g., bridging module 245) for further processing. The packet then proceeds through steps 425, 430 and 440, then is sent out the proper interface in step 445. If the output interface is not a BVI, the process continues from step 465 to step 475: the packet is treated as a normal routed packet, is sent to the network driver (step 440) and sent out the appropriate interface (step 445).

An L2 software interface between the bridging module the L3 firewall code preferably takes care of invoking the IP ACLs. In such implementations, the L2 software interface invokes the inbound and outbound IP ACLs for all IP packets irrespective of whether inspection is configured on the input or output interfaces of a packet. All that is needed is that an ACL is configured on any one of the interfaces in the bridge group. For example, suppose interfaces A, B and C are in a bridge group, inspection is configured on A (in direction) and IP ACL is configured on C (in direction). In this example, a packet from C to B will be subjected to the IP ACL check, though inspection is not configured on B or C. Otherwise, packets from C to A would be subjected to the ACL check, but packets from C to B would not.

Clients on one side of a bridge should be able to get an IP address from a DHCP server on the opposite side. To facilitate this, the L2 firewall preferably allows DHCP packets to be bridged without inspection and does not affect the existing DHCP operation on the network. However, DHCP packets are inspected in other implementations. Other types of packets, such as OSPF packets, BGP packets, ARP packets, etc., may also be passed through without inspection in some implementations. However, such packets are inspected in other implementations.

Various implementations of the invention provide NAT for traffic going out to the Internet (on outside router interface) while still using private addresses for bridging between internal bridge interfaces. Moreover, this invention provides the ability to run a routing protocol on the firewall and to allow dynamic routing instead of configuring static routes. This invention also provides ability to relay DHCP requests form hosts on bridge interfaces to a DHCP server connected to one of the router interfaces. These and other features provide ease of deployment where services such as DHCP are available.

Figure 5:
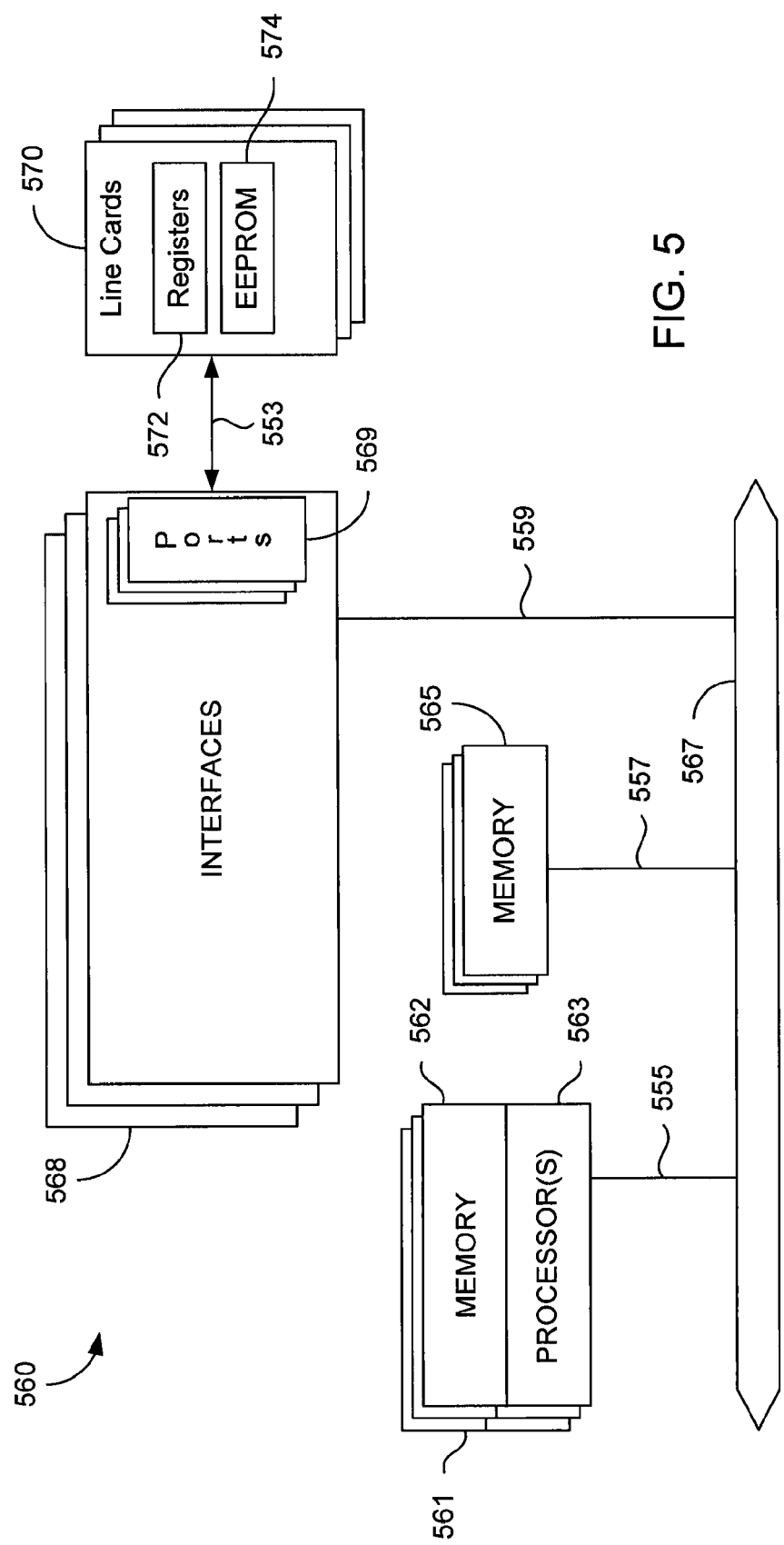
FIG. 5 illustrates a simplified version of a network device that may be configured to implement some aspects of the present invention.

FIG. 5 illustrates an example of a network device that may be configured to implement some methods of the present invention. Network device 560 includes a master central processing unit (CPU) 562, interfaces 568, and a bus 567 (e.g., a PCI bus). Generally, interfaces 568 include ports 569 appropriate for communication with the appropriate media. In some embodiments, one or more of interfaces 568 includes at least one independent processor 574 and, in some instances, volatile RAM. Independent processors 574 may be, for example ASICs or any other appropriate processors. According to some such embodiments, these independent processors 574 perform at least some of the functions of the logic described herein. In some embodiments, one or more of interfaces 568 control such communications-intensive tasks as media control and management. By providing separate processors for the communications-intensive tasks, interfaces 568 allow the master microprocessor 562 efficiently to perform other functions such as routing computations, network diagnostics, security functions, etc.

The interfaces 568 are typically provided as interface cards (sometimes referred to as "linecards"). Generally, interfaces 568 control the sending and receiving of data packets over the network and sometimes support other peripherals used with the network device 560. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 562 may be responsible for implementing specific functions associated with the functions of a desired network device. According to some embodiments, CPU 562 accomplishes all these functions under the control of software including an operating system (e.g., Cisco IOS, a proprietary operating system developed by Cisco Systems, Inc., etc.) and any appropriate applications software.

CPU 562 may include one or more processors 563 such as a processor from the Motorola family of microprocessors or the MIPS family of microprocessors. In an alternative embodiment, processor 563 is specially designed hardware for controlling the operations of network device 560. In a specific embodiment, a memory 561 (such as non-volatile RAM and/or ROM) also forms part of CPU 562. However, there are many different ways in which memory could be coupled to the system. Memory block 561 may be used for a variety of purposes such as, for example, caching and/or storing data, programming instructions, etc.

Regardless of network device's configuration, it may employ one or more memories or memory modules (such as, for example, memory block 565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the system shown in FIG. 5 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/linecards may be bus based (as shown in FIG. 5) or switch fabric based (such as a cross-bar).

OTHER EMBODIMENTS

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, the network device described above with reference to FIG. 5. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Another embodiment of this invention involves splitting the functionality into two parts. One part is the control plane, which builds the bridge table, provides any inspection (if required) of DHCP, ARP or OSPF packets which need to be passed through to maintain transparency, builds the routing table, etc. The other is a data plane, which enforces the screening policies, decides whether to bridge or route packets and accordingly rewrites the packet headers before transmitting them, maintains the state of the flow, etc. The control plane can be implemented, for example, in a general purpose CPU while the data plane can be implemented in network processors. This specific implementation provides both a flexibility of features and a required data rate of firewalling. Any change in policies (for example up to what extent to inspect OSPF packets and which packets should be inspected) can be implemented in a general purpose CPU and does not affect the data rate in network processors.

Although illustrative embodiments and applications of this invention are shown and described herein, many variations and modifications are possible which remain within the concept, scope, and spirit of the invention, and these variations would become clear to those of ordinary skill in the art after perusal of this application.

Accordingly, the present embodiments are to be considered as illustrative and not restrictive, and the invention is not to be limited to the details given herein, but may be modified within the scope and equivalents of the appended claims.

We claim:

1. A firewall, comprising:
   a first port configured for communication with a first device within a first network;
   a second port configured for communication with a second device within the first network;
   a third port configured for communication between the first network and a second network; and
   a processor configured to:
   determine that a first portion of the incoming packets should be bridged, the first portion having a first source address and a first destination address within the first network, wherein the step of determining that the first portion should be bridged comprises performing a bridge lookup based upon media access control address information of the incoming packets;
   apply a first screening process to the first portion;
   determine that a second portion of the incoming packets should be routed, the second portion having a second source address or a second destination address outside the first network; and
   apply a second screening process to the second portion.

2. The firewall of claim 1, wherein the at least one processor is configured to control traffic between the first device and the second device according to a spanning tree protocol.

3. The firewall of claim 1, wherein the at least one processor is configured to control traffic between the first device and the second device according to one or more fields in a layer 2 header of a packet.

4. The firewall of claim 1, wherein the at least one processor is configured to perform an initial check on a packet, wherein the procedures of the initial check are selected from the group consisting of checking for broadcasting, multicasting and Internet protocol fragments.

5. The firewall of claim 1, wherein the at least one processor is configured to apply the first screening process according to security policies implemented at one or more of layers 3 through 7.

6. The firewall of claim 3, wherein the at least one processor is configured to control traffic between the first device and the second device according to layer 2 access lists applied to one or more fields in the layer 2 header of the packet.

7. The firewall of claim 1, wherein the at least one processor is configured to apply the second screening process according to security policies implemented at one or more of layers 3 through 7.

8. The firewall of claim 1, further comprising a control plane configured to build a bridge table.

9. The firewall of claim 8, wherein the control plane is further configured to inspect one or more of DHCP, ARP or OSPF packets.

10. The firewall of claim 8, wherein the control plane is further configured to builds a routing table.

11. The firewall of claim 1, further comprising a data plane configured to enforce screening policies.

12. The firewall of claim 11, wherein the data plane is further configured to determine whether to bridge or route packets.

13. The firewall of claim 12, wherein the data plane is further configured to rewrite packet headers before transmitting packets.

14. A firewall, comprising:
means for receiving first packets and second packets at a first device;
means for determining, at the first device, that the first packets should be bridged, the first packets having a first source address and a first destination address within the first network, wherein the means determines that the first packets should be bridged by performing a bridge lookup based upon media access control address information of the first packets;
means for applying a first screening process to the first packets at the first device;
means for determining, at the first device, that the second packets should be routed; and
means for applying a second screening process to the second packets at the first device.

15. A method of implementing a firewall, comprising:
receiving first packets and second packets at a first device;
determining, at the first device, that the first packets should be bridged, the first packets having a first source address and a first destination address within the first network, wherein determining that the first packets should be bridged comprises performing a bridge lookup based upon media access control address information of the first packets;
applying a first screening process to the first packets at the first device;
determining, at the first device, that the second packets should be routed; and
applying a second screening process to the second packets at the first device.

16. The method of claim 15, wherein the second screening process comprises performing an access list check.

17. The method of claim 15, wherein the first screening process comprises applying security policies implemented at one or more of layers 3 through 7.

18. A computer program embodied in a machine-readable medium, the computer program comprising instructions for controlling a firewall to perform the following steps:
receive first packets and second packets at a first device;
determine, at the first device, that the first packets should be bridged, the first packets having a first source address and a first destination address within the first network;
perform a bridge lookup based upon media access control address information of the first packets;
apply a first screening process to the first packets at the first device;
determine, at the first device, that the second packets should be routed; and
apply a second screening process to the second packets at the first device.

19. The computer program of claim 18, wherein the instructions for applying the first screening process further comprise instructions for causing the firewall to perform an access list check.

20. The computer program of claim 18, wherein the instructions for applying the second screening process further comprise instructions for causing the firewall to perform an access list check.

* * * * *